US012710105B2

(12) United States Patent
Peterson

(10) Patent No.: US 12,710,105 B2
(45) Date of Patent: Aug. 18, 2026

(54) METHOD FOR A MANUFACTURING OF A MULTIPLE POPPET VALVE AND AN AT LEAST DUAL POPPET VALVE

(71) Applicant: ETO GRUPPE TECHNOLOGIES GmbH, Stockach (DE)

(72) Inventor: Matthew Peterson, Ada, MI (US)

(73) Assignee: ETO GRUPPE TECHNOLOGIES GmbH, Stockach (DE)

( * ) Notice: Subject to any disclaimer, the term of this patent is extended or adjusted under 35 U.S.C. 154(b) by 124 days.

(21) Appl. No.: 18/797,935

(22) Filed: Aug. 8, 2024

(65) Prior Publication Data

US 2026/0043489 A1 Feb. 12, 2026

(51) Int. Cl.
*F16K 17/10* (2006.01)
*F16K 29/02* (2006.01)

(52) U.S. Cl.
CPC .............. *F16K 17/10* (2013.01); *F16K 29/02* (2013.01); *F16K 2200/402* (2021.08)

(58) Field of Classification Search
CPC .. F16K 17/10; F16K 29/02; F16K 2200/0402; F16K 1/425; F16K 11/048; Y10T 137/86879; Y10T 137/6065
USPC ........................ 137/315.27, 315.41; 251/365
See application file for complete search history.

(56) References Cited

U.S. PATENT DOCUMENTS 3,927,692 A * 12/1975 Wenrich ................ F16K 11/048 137/625.27
6,705,591 B2 * 3/2004 deCler .................... F16K 3/267 251/340
6,814,102 B2 * 11/2004 Hess ..................... F16K 11/048 137/315.27
12,228,011 B2 * 2/2025 Gaspard ................ E21B 34/102
2001/0035220 A1 * 11/2001 Russell ................... F16K 31/56 137/625.48
2002/0130291 A1 * 9/2002 Geib ....................... F16K 1/443 251/214
2004/0021537 A1 * 2/2004 Zutt ...................... B23P 11/005 335/220
2006/0278286 A1 * 12/2006 Spakowski ............. F16K 1/443 137/628
2012/0305106 A1 * 12/2012 Morse ................. F16K 27/0218 29/428

FOREIGN PATENT DOCUMENTS

DE 102013010556 A1 * 1/2015 ............ F16K 11/048
GB 510467 A * 8/1939 ............ F16K 11/048

* cited by examiner

*Primary Examiner* — Jessica Cahill
(74) *Attorney, Agent, or Firm* — Posz Law Group, PLC

(57) ABSTRACT

A method for a manufacturing of a multiple poppet valve is proposed, with the multiple poppet valve at least comprising: a first valve seat, a second valve seat, a first poppet for opening and closing the first valve seat, a second poppet for opening and closing the second valve seat, and a common valve stem comprising the first poppet and the second poppet, wherein the method at least comprises the method steps of joining a first valve component comprising the first valve seat with a second valve component comprising the second valve seat, and subsequently setting a distance between the first valve seat and the second valve seat by permanently displacing one of the valve seats towards the other one of the valve seats.

16 Claims, 3 Drawing Sheets

Figure 1:
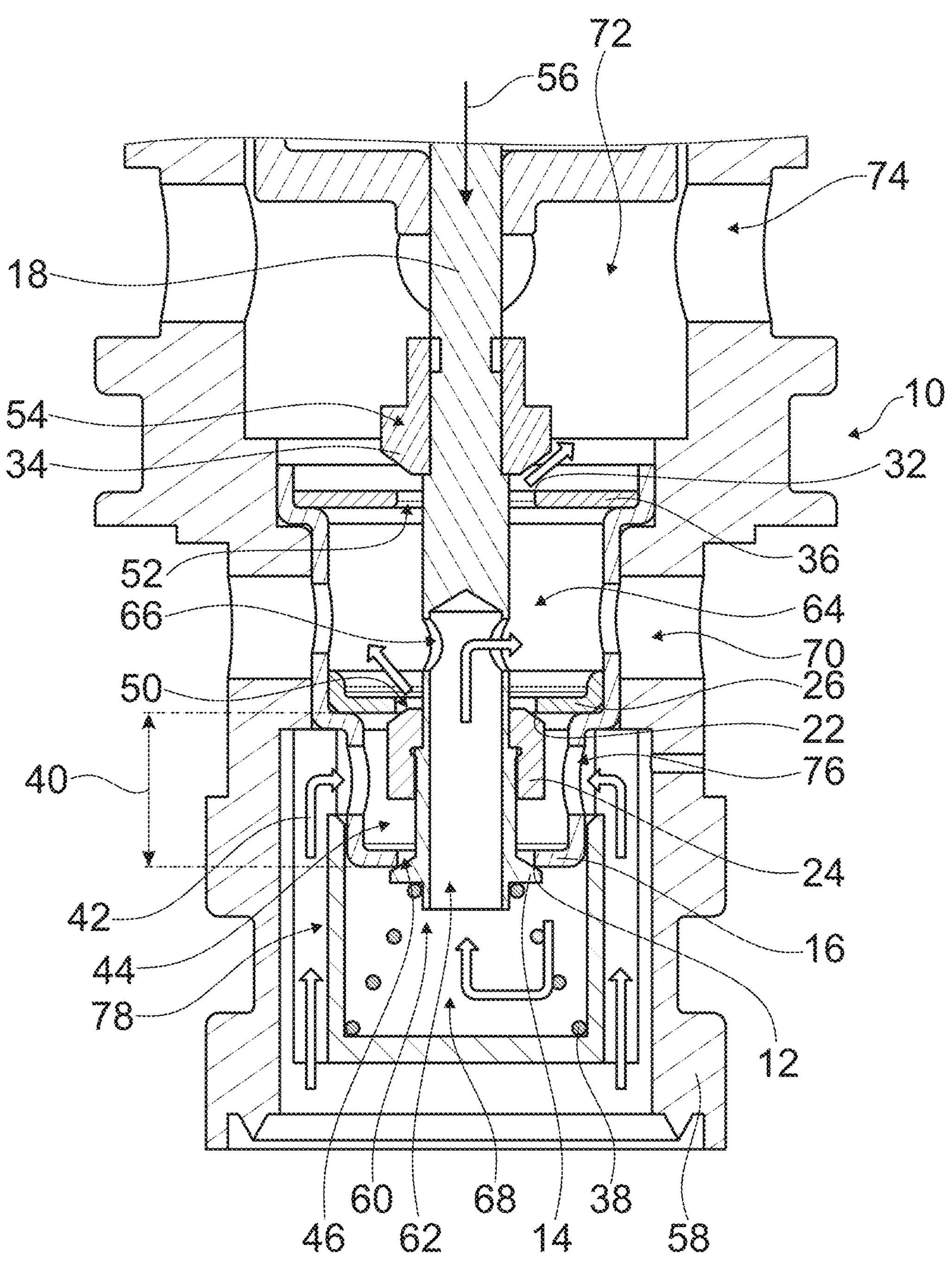

METHOD FOR A MANUFACTURING OF A MULTIPLE POPPET VALVE AND AN AT LEAST DUAL POPPET VALVE

STATE OF THE ART

The invention relates to a method for a manufacturing of a multiple poppet valve and an at least dual poppet valve.

From the state of the art, various types of dual poppet valves are known. Dual poppet valves generally provide cost and/or complexity advantages as well as an improved contamination robustness over single poppet valves. A tradeoff of many known solutions of this type, however, is the difficulty in achieving a good seal over both sealing seats simultaneously.

The objective of the invention is in particular to provide a dual or multiple poppet valve device with advantageous properties regarding the sealing tightness of all sealing seats. The objective is achieved, according to the invention, by the features of the independent claims while advantageous implementations and further developments of the invention may be gathered from the subordinate claims.

Advantages of the Invention

The invention pertains to a method for a manufacturing of a multiple poppet valve, in particular of a dual poppet valve, the multiple poppet valve at least comprising: a first valve seat, a second valve seat, a first poppet for opening and closing the first valve seat, a second poppet for opening and closing the second valve seat, and a common valve stem comprising the first poppet and the second poppet, in particular to which the first poppet and/or the second poppet are attached and/or which forms the first poppet and/or the second poppet.

It is proposed that the method at least comprises the method steps of joining a first valve component comprising the first valve seat with a second valve component comprising the second valve seat, and subsequently setting a distance between the first valve seat and the second valve seat by permanently displacing one of the valve seats towards the other one of the valve seats. By this design, advantageous characteristics regarding the sealing tightness of all sealing seats, in particular at least of the first valve seat and the second valve seat, can be achieved. In particular, the invention allows a setting of a leakage dynamically during assembly of the multiple poppet valve. Consequently, a high manufacturing precision and/or a reproducibility can advantageously be achieved.

A "multiple poppet valve" is, in particular, to be understood as a valve or a component of a valve with two or more, often plate-shaped, disc-shaped, barrel-shaped, plug-shaped, barrel-plug-shaped or cylinder shaped, valve plugs, i.e. the poppets, which are actuated via a common rod, i.e. the valve stem. Each poppet preferably is allocated to a different valve seat of the multiple poppet valve. Preferably, the poppets are moved in a linear fashion within a valve guide, which could be a pipe, a container or the like. Typically, the poppets have a round or oval shape, often disc-shape, plug-shape, barrel-shape or cylinder shape, however alternative shapes, like polygonal shapes or concave shapes are conceivable. Preferably, the poppets are arranged close to an end region of the valve stem. The valve stem is preferably implemented as a straight rod, which in particular has a round or oval or differently shaped cross section. In particular, the valve stem is actuated directly or indirectly by an electromagnet, by a magnetic actuator system or by another actuating system. The valve stem in particular carries and/or actuates all of the poppets at the same time. The poppets comprise at least one sealing surface each, which is configured to provide a sealing function, when interacting with the respective valve seat. Preferably, none of the poppets interacts with more than one valve seat. The sealing surfaces of the poppets are, in particular, located at rear ends of the poppets. The sealing surfaces preferably face away from the end of the valve stem. The sealing surfaces preferably face towards the electromagnet/the magnetic actuator system. Preferably, the sealing surfaces of the poppets face in the same direction. Alternatively, the sealing surfaces could also face in opposite directions or all face away from the electromagnet/the magnetic actuator system or face towards the end of the valve stem. In particular, the sealing surfaces face towards a direction, which is at least substantially parallel to a longitudinal extension/direction of the valve stem. Preferably, the sealing surfaces are located on a surface of the poppet, which is arranged at least substantially perpendicularly relative to the longitudinal extension/direction of the valve stem.

The poppets and the valve stems can be formed separately from each other or integrally with each other. By the poppet and the valve stem being formed separately from each other it is in particular to be understood that the valve stem and the poppet each are separate entities and/or components, which for example merely act on each other but are not necessarily substance-bound with each other. By the poppet and the valve stem being formed integrally with each other, it is in particular to be understood that the valve stem forms the poppet, in particular that the valve stem and the poppet are parts of the same monolithic component. It is conceivable that one of two poppets is formed separately from the valve stem, while the other one of the two poppets is formed integrally with the valve stem. The valve stem is preferably configured to push and/or pull the poppet towards the valve seat or away from the valve seat. The poppets are located at different places along a longitudinal direction of the common valve stem. The longitudinal direction of the valve stem in particular extends at least substantially parallel to a central longitudinal axis of the valve stem and/or parallel to a main direction of extension of the valve stem. A "main direction of extension" of an object shall in particular be understood as a direction parallel to a longest edge of a smallest geometric box, which just completely encloses the object. The longitudinal direction of the valve stem in particular extends at least substantially perpendicular to a main extension plane of the poppet and/or of the sealing surface. By a "main extension plane" of an object shall be understood in particular a plane which is parallel to a largest side surface of a smallest imaginary cuboid which just completely encloses the construction unit, and in particular runs through the center of the cuboid.

A distance between the valve seats of the multiple poppet valve, in particular between the first valve seat and the second valve seat, preferably extends in a direction parallel to the longitudinal direction of the common valve stem. The first valve seat and the second valve seat preferably are to be closed simultaneously by the respective poppet. It, however is conceivable that the multiple poppet valve comprises at least one third valve seat, which is opened and closed by a third poppet, which is opened when the other two valve seats are closed. The combination of third valve seat a third poppet could form an exhaust valve of the multiple poppet valve. In particular, the term "configured" shall be understood to mean specially programmed, designed and/or equipped. By "configured" it is to be understood in particular that an object is intended for a certain function, that the object fulfills and/or executes this certain function in at least one application and/or operating state.

One of the first valve component with the first valve seat and the second valve component with the second valve seat could be embodied as a part of the valve guide while the other one of the first valve component and the second valve component is embodied as a structural part that is separate/separable from the valve guide. The first valve component with the first valve seat and the second valve component with the second valve seat are preferably joined with each other by pressing one of the valve components into an opening/receiving region of the other one of the valve components. Alternatively or additionally, it is also conceivable that the valve components are glued, welded or otherwise materially bonded to each other. Prior to joining the valve components with each other, the common valve stem with the poppets is inserted into the valve guide. After the joining of the valve components, the common valve stem cannot be pulled out of the valve guide anymore, since the poppets would impact with the respective valve seats of the valve components. The permanent displacing of one or both of the valve seas comprises a bending and/or reshaping of parts of the respective valve components. The first valve component and/or the second valve component are preferably made from a metal or from another plastically deformable material. The first poppet and/or the second poppet could be made of a metal or of an elastically deformable sealing material like a rubber or similar. The setting of a distance between the first valve seat and the second valve seat could involve a pressing of a part of a valve component, in particular a part of the valve component that comprises the valve seat, in a direction that is at least substantially parallel to the longitudinal direction (of the valve stem). The two poppet valves of the multiple poppet valve, embodied by the first valve seat and the first poppet and by the second valve seat and the second poppet are configured to divide a flow that passes the multiple poppet valve and/or to balance the whole valve assembly. The setting of the distance between the first valve seat and the second valve seat in particular is configured to calibrate the first valve seat and/or the second valve seat, preferably in terms of setting a leakage across the two valve seats.

It is further proposed that the permanent displacement of the valve seat is achieved by plastic deformation at least of the valve components comprising the valve seat that is to be displaced, preferably the of second valve component with the second valve seat or of both valve components. Thereby, a precise, reproducible and calibratable setting of the valve seat distance and/or the leakage can be achieved. Preferably, at least the part of the valve component that is to be plastically deformed is bent, in particular in a direction towards the valve seat of the other valve component, forcibly using a calibration tool/pressing tool/valve seat setting tool. In particular, the (second) valve seat is displaced in a direction that is parallel to the longitudinal direction and preferably pointing towards the other (first) valve seat. In particular, the first valve seat and the second valve seat are closer together after the displacement than before the displacement.

In addition, it is proposed that during the displacement, in particular during a displacement process comprising the permanent displacement of one of the valve seats, of the valve seat the other valve seat is sealed by the corresponding poppet. Thereby, advantageously, the optimal distance between the valve seats can be set and/or calibrated. Preferably, during the displacement process of the part of the second valve component that comprises the second valve seat, the first poppet sits tight onto the first valve seat. Preferably, also immediately before the displacement process of the part of the second valve component that comprises the second valve seat, the first poppet sits tight onto the first valve seat. Preferably immediately before the displacement process of the part of the second valve component that comprises the second valve seat, the second poppet is distanced from the second valve seat. Preferably immediately after the displacement process of the part of the second valve component that comprises the second valve seat, the second poppet is in contact with the second valve seat or at least almost in contact with the second valve seat.

If during the joining of the valve components, an initial distance between the valve seats is intentionally made larger than a distance between the first poppet and the second poppet, in particular larger than a distance between sealing contours of the two poppets, a very precise and reproducible setting and/or calibrating of the closing positions of the two poppets can be achieved. Preferably a leakage across the two valve seats can be precisely calibrated and/or reduced to a minimum. Preferably, the initial distance between the valve seats is at least a few millimeters (e.g. 5 mm, 3 mm or 2 mm) larger than a distance between the first poppet and the second poppet.

If additionally, during the displacement of the valve seat, in particular during a displacement process comprising the permanent displacement of one of the valve seats, the other valve seat remains undeformed and undisplaced, a particularly precise setting and/or calibrating of the closing positions of the two poppets can be achieved. Preferably a leakage across the two valve seats can be precisely calibrated and/or reduced to a minimum. Advantageously the displacement procedure can be kept as simple as possible. Preferably, the calibration tool/pressing tool/valve seat setting tool that is exerting the displacement force causing the permanent displacement is only contacting the valve component with the valve seat that is to be displaced, in particular only the second valve component with the second valve seat.

Moreover, it is proposed that during the displacement of the valve seat, in particular during the displacement process comprising the permanent displacement of one of the valve seats, the other valve seat is kept sealed by forcing the corresponding poppet into a sealing position via a spring force of a spring which interacts with the valve stem and/or with the corresponding poppet. Thereby, advantageously, the optimal distance between the valve seats can be set and/or calibrated. Furthermore, a leakage across the two valve seats can advantageously be monitored during the displacement process. The spring preferably is a compression spring. The spring preferably is supported at the valve stem, for example at a free end of the valve stem, and/or at the first poppet, in particular on a side facing away from a sealing surface of the first poppet. Preferably, the spring is supported at a valve housing of the multiple poppet valve with an opposing end.

Additionally, it is proposed that during the displacement of the valve seat, in particular during the displacement process comprising the permanent displacement of one of the valve seats, an externally generated pressure force of a supply pressure fluid is applied to an interspace between the first valve seat and the second valve seat. Thereby, leakage changes while displacing the valve seat can advantageously be identified. Thus, advantageously, the optimal distance between the valve seats can be set and/or calibrated.

If additionally or alternatively a leakage of at least the displaced valve seat, preferably a leakage across the first valve seat and the second valve seat, is measured during the displacement of the valve seat, in particular during the displacement process comprising the permanent displacement of one of the valve seats, and the amount of displacement of the valve seat is set depending on the measured leakage the optimal distance between the valve seats can advantageously be set and/or calibrated very precisely. Preferably, the leakage is monitored and the displacement procedure is stopped as soon as a lower threshold leakage is reached.

Furthermore, it is proposed that prior to the joining of the valve components, the valve stem comprising at least the second poppet is inserted into a designated interspace between the valve seats, in particular in a way that the second poppet is arranged within the interspace between the valve seats. Thereby an easy assembly can be achieved advantageously. Furthermore, a compact design can be achieved advantageously. The interspace is, in particular, except for the valve openings defined by the two valve seats, completely enclosed by the first valve component and the second valve component. The interspace is at least designated to accommodate the second poppet in a mounted state of the multiple poppet valve. The first poppet is, in particular, located outside of the interspace. Preferably, the first poppet is located on a side of the interspace that is opposite to the electromagnet, the magnetic actuator system or the other actuating system that actuates the common valve stem.

Additionally, it is proposed that the valve seat, which is displaced during the setting of the distance between the first valve seat and the second valve seat, is arranged in front of the other valve seat when viewed along longitudinal direction of the valve stem that is pointing towards a free end of the valve stem, in particular along an opening direction of the valve stem. Thus, an advantageous construction of the multiple poppet valve can be achieved. The opening direction of the valve stem preferably is the direction in which the valve stem (and thus the poppets) moves, when it transitions from a "closed" state of the valve to an "open" state of the valve. Mostly, the opening direction points away from the electromagnet/the magnetic actuator system of the multiple poppet valve, however it is also conceivable that the opening direction points towards the electromagnet/the magnetic actuator system of the multiple poppet valve.

Moreover, it is proposed that to set the (optimum) distance between the first valve seat and the second valve seat, the valve seat setting tool is brought into contact with an entire circumference of a valve opening of the valve seat in order to exert a uniform pressing force to the whole valve seat. Thus, a very high manufacturing precision can be achieved. Advantageously, the leakage across the two valve seats can be set/calibrated very precisely.

It is additionally proposed that the valve seat setting tool is slid over the valve stem, (completely) surrounding at least a (longitudinal) section of the valve stem during the setting procedure. Thereby, an advantageously simple and compact manufacturing can be achieved. The valve seat setting tool preferably is embodied pipe-like/tubular with pressing surfaces at its free ends.

Furthermore, it is proposed that after a completion of the setting process of the respective valve seat, a third valve component comprising a third valve seat is joined with the second valve component and/or with the first valve component. Thus, an advantageous and easy manufacturing of the multiple poppet valve can be achieved. Advantageously, the multiple poppet valve can be manufactured in a very compact way. Preferably, the third valve seat is an exhaust valve seat. Preferably, the third valve seat is operated by a third poppet of the common valve stem. Preferably, the third valve seat/the third poppet is arranged further away from the free end of the common valve stem than the first valve seat/the first poppet and the second valve seat/the second poppet. Preferably, the third valve seat/the third poppet is arranged closer to the electromagnet/the magnetic actuator system than the first valve seat/the first poppet and the second valve seat/the second poppet. Preferably, the third valve component (similarly to the second valve component) is pressed into an opening/receiving region of the first valve component. Alternatively or additionally, it is also conceivable that the third valve component is glued, welded or otherwise materially bonded to one of the other valve components or even only to a valve housing that is separate to the valve components. The third poppet could be arranged in a further interspace between the second valve component and the third valve component, however, preferably, the third poppet is arranged outside the further interspace between the second valve component and the third valve component.

It is proposed that the third valve seat is disposed in front of the first valve seat and in front of the second valve seat, when viewed along the longitudinal direction of the valve stem that is pointing towards the free end of the valve stem and/or when viewed along the opening direction. Thus, an advantageous and simple to produce multiple poppet valve with at least three valve seats can be achieved.

Additionally, it is proposed that a direction in which the valve stem is to be moved in order to open the third valve seat is the opposite of a direction in which the valve stem is to be moved to open the first valve seat and the second valve seat. Thus, advantageously, an exhaust valve can be added to a dual poppet valve for dividing a flow. In particular, an advantageous valve construction can be achieved.

Further, an at least dual poppet valve, manufactured via the method described above and at least comprising: the first valve seat, the second valve seat, the first poppet for opening and closing the first valve seat, the second poppet for opening and closing the second valve seat, and the common valve stem comprising first poppet and the second poppet, is proposed. By this design, advantageous characteristics regarding the sealing tightness of all sealing seats, in particular at least of the first valve seat and the second valve seat, can be achieved.

The method according to the invention and the at least dual poppet valve according to the invention are herein not to be restricted to the applications and implementation forms described above or pictured below. In particular, to fulfill a functionality herein described, the method according to the invention and the at least dual poppet valve may comprise a number of respective elements and/or structural components and/or units and/or method steps that differ/s from a number herein mentioned.

DRAWINGS

Further advantages will become apparent from the following description of the drawings. In the drawings, one exemplary embodiment of the invention is depicted. The drawings, the description and the claims contain a plurality of features in combination. Someone skilled in the art will purposefully also consider the features separately and will find further expedient combinations.

Figure 2:
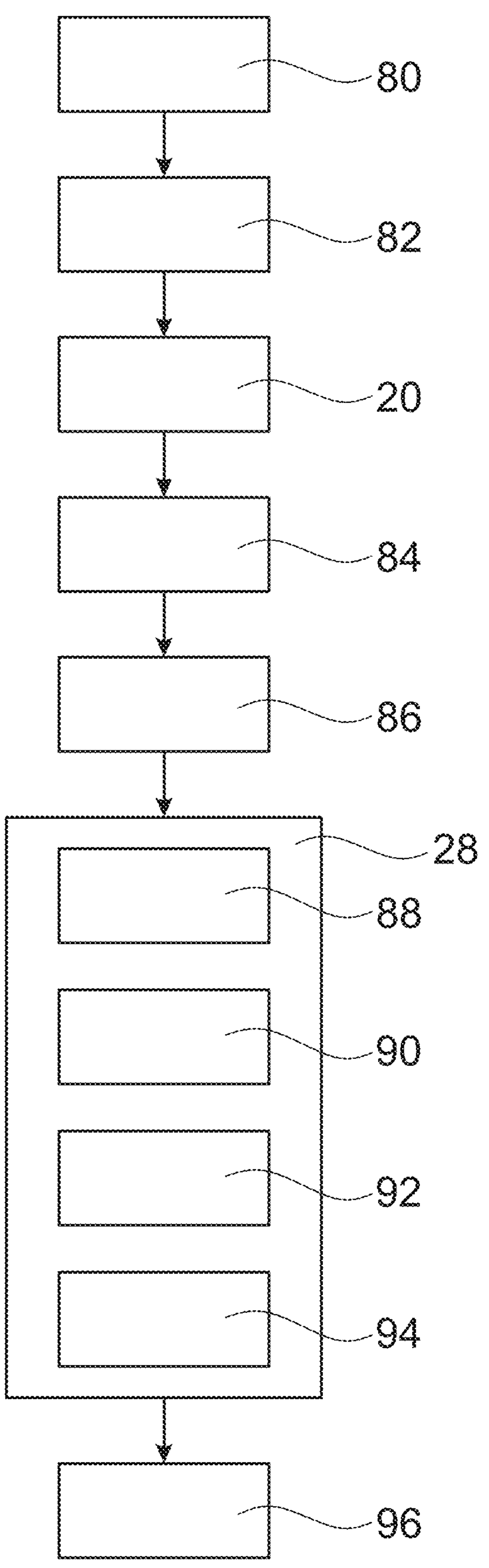
Figure 3:
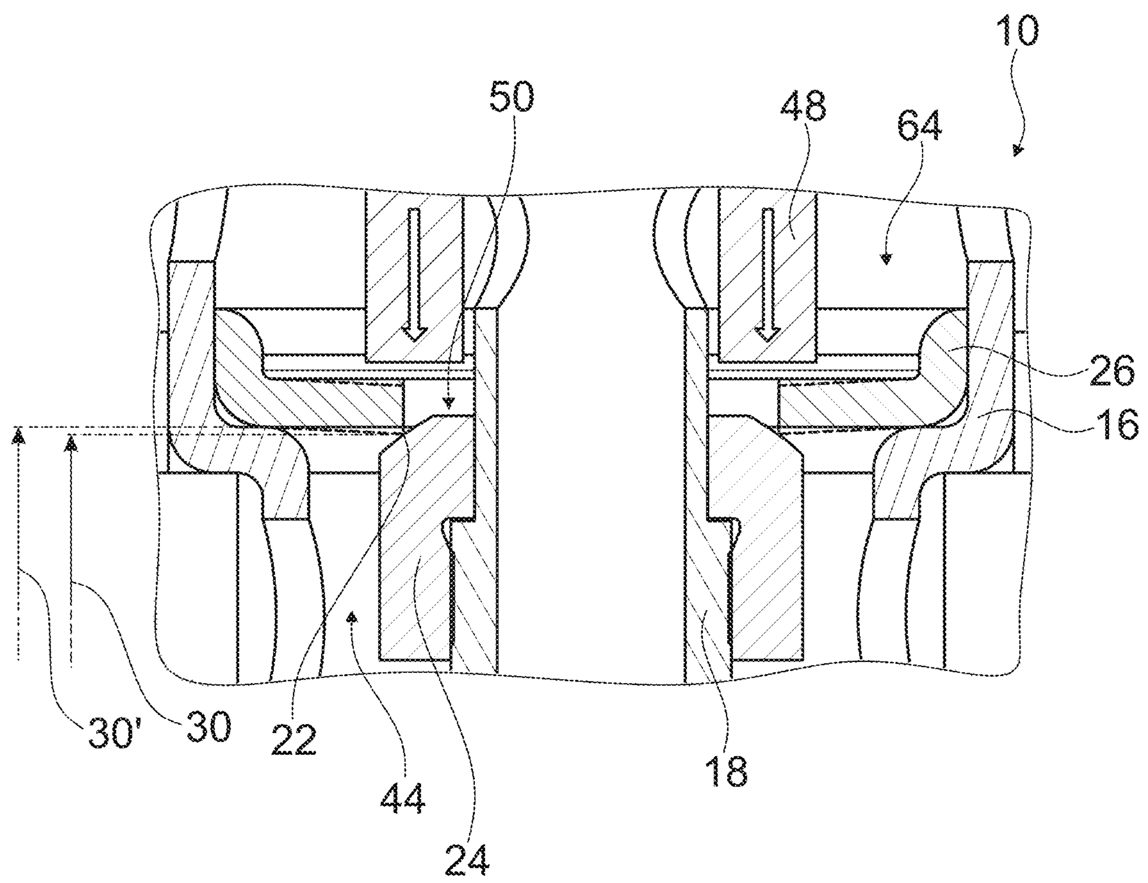

It is Shown in:

FIG. 1 a schematic cross-sectional view of a multiple poppet valve,

FIG. 2 a schematic flow diagram of a method for a manufacturing of the multiple poppet valve and FIG. 3 a schematic view of a valve seat setting tool and an enlarged section of the cross-sectional view of a multiple poppet valve of FIG. 1, further illustrating the displacement of a valve seat of the multiple poppet valve during the manufacturing of the multiple poppet valve.

DESCRIPTION OF THE EXEMPLARY EMBODIMENT

The FIG. 1 shows a multiple poppet valve 10. The multiple poppet valve 10 is intended for a use in a pneumatic or hydraulic system. The multiple poppet valve 10 is a hydraulic control valve or a pneumatic control valve. The multiple poppet valve 10 could, for example, be applied as an oil valve for a stroke control. Other applications however are also conceivable. The multiple poppet valve 10 is a triple poppet valve 10 or more precisely a dual poppet valve 10 with an additional exhaust valve 54. The multiple poppet valve 10 comprises a first valve component 16. The multiple poppet valve 10 comprises a first valve seat 12. The first valve seat 12 is a part of the first valve component 16. The first valve seat 12 surrounds a (circular) first valve opening 46 within the first valve component 16. The multiple poppet valve 10 comprises a valve stem 18. The valve stem 18 is the only valve stem 18 of the multiple poppet valve 10 and comprises all poppets 14, 24, 34 of the multiple poppet valve 10. The valve stem 18 thus is a common valve stem 18 for all poppets 14, 24, 34. The multiple poppet valve 10 comprises the first poppet 14. The first poppet 14 is configured for an opening and a closing of the first valve seat 12. The first poppet 14 is formed integrally with the valve stem 18. Alternatively, the first poppet 14 could be attached to the valve stem 18. The first poppet 14 is the poppet 14 of the multiple poppet valve 10 that is arranged closest to a free end 60 of the valve stem 18. The first poppet 14 is completely arranged below/completely arranged on the same side of the first valve component 16/of all valve components 16, 26, 36 of the multiple poppet valve 10 along a longitudinal direction 56 of the valve stem 18.

The multiple poppet valve 10 comprises the second valve component 26. The second valve component 26 is manufactured separately from the first valve component 16. The second valve component 26 is pressed into the first valve component 16. The second valve component 26 is unmovably fixed to the first valve component 16. The multiple poppet valve 10 comprises a second valve seat 22. The second valve seat 22 is a part of the second valve component 26. The second valve seat 22 surrounds a (circular) second valve opening 50 within the second valve component 26. The multiple poppet valve 10 comprises the second poppet 24. The second poppet 24 is configured for an opening and a closing of the second valve seat 22. The second poppet 24 is attached to the valve stem 18. Alternatively, the second poppet 24 could be formed integrally with the valve stem 18. The first valve seat 12 and the second valve seat 22 in the finished manufacturing state are separated by a setting distance 30 in a direction parallel to the longitudinal direction 56 of the valve stem 18. In the finished manufacturing state, the setting distance 30 is about the same as a distance 40 between the first poppet 14 and the second poppet 24 along the longitudinal direction 56 of the valve stem 18. In an unfinished intermediate manufacturing step, the setting distance 30' is a bit larger (see FIG. 3). The combination of the first valve component 16 and the second valve component 26 forms an interspace 44. The second poppet 24 is arranged completely within the interspace 44.

The second valve seat 22 is arranged in front of the first valve seat 12 when viewed along the longitudinal direction 56 of the valve stem 18 that is pointing towards the free end 60 of the valve stem 18. The multiple poppet valve 10 comprises a spring 38. The spring 38 is with a first end supported at a housing 58 of the multiple poppet valve 10. The spring 38 is with a second end supported at the valve stem 18. The spring 38 is with the second end supported at the first poppet 14. The spring 38 creates a spring force, which pushes the valve stem 18 away from a bottom part of the housing 58 and towards an electromagnet (not shown) of the multiple poppet valve 10. The spring 38 creates a spring force, which pushes at least the first poppet 14 onto the first valve seat 12.

The valve stem 18 is partially hollow. The valve stem 18 comprises a hollow 62. The hollow 62 is open at the free end 60 of the valve stem 18. The hollow 62 extends along a part of the longitudinal direction 56 of the valve stem 18. The hollow 62 extends beyond the interspace 44. The hollow 62 is closed towards the interspace 44. The interspace 44 comprises supply pressure openings 76. The supply pressure openings 76 are connected with supply pressure channels 78. The supply pressure channels 78 are configured to convey a supply pressure fluid 42 towards the interspace 44. The supply pressure channels 78 are connected to an externally controllable pressure source (not shown).

The multiple poppet valve 10 comprises the third valve component 36. The third valve component 36 is manufactured separately from the first valve component 16. The third valve component 36 is manufactured separately from the second valve component 26. The third valve component 36 is pressed into the first valve component 16. The third valve component 36 is unmovably fixed to the first valve component 16. The multiple poppet valve 10 comprises a third valve seat 32. The third valve seat 32 is a part of the third valve component 36. The third valve seat 32 surrounds a (circular) third valve opening 52 within the third valve component 36. The multiple poppet valve 10 comprises the third poppet 34. The third poppet 34 is configured for an opening and a closing of the third valve seat 32. The third poppet 34 is attached to the valve stem 18. Alternatively, the third poppet 34 could be formed integrally with the valve stem 18. The combination of the first valve component 16 and the third valve component 36 forms a further interspace 64 which is arranged completely between the second valve component 26 and the third valve component 36. The hollow 62 of the valve stem 18 extends into the region of the valve stem 18 which overlaps with the further interspace 64. A direction in which the valve stem 18 is to be moved in order to open the third valve seat 32 is the opposite of a direction in which the valve stem 18 is to be moved to open the first valve seat 12 and the second valve seat 22. The first valve seat 12 and the second valve seat 22 are always opened simultaneously.

The hollow 62 comprises lateral openings 66, through which the hollow 62 and thus also a chamber 68 surrounding the free end 60 of the valve stem 18 is connected with the further interspace 64. The spring 38 is completely arranged in this chamber 68. The chamber 68 is surrounded by the housing 58. The first valve seat 12 and the first poppet 14 open and close the chamber 68 to the interspace 44. The second valve seat 22 and the second poppet 24 open and close the interspace 44 to the further interspace 64. The further interspace 64 is connected with a control pressure outlet 70. The control pressure outlet 70 is embodied as an opening within an outer wall of the housing 58. The third valve seat 32 and the third poppet 44 open and close the further interspace 64 to a further chamber 72 of the multiple poppet valve 10. The further chamber 72 is arranged on an opposite side of the valve components 16, 26, 36 along the longitudinal direction 56 of the valve stem 18. The further chamber 72 is surrounded by the housing 58. The further chamber 72 is connected with an exhaust pressure outlet 74.

The FIG. 2 shows a schematic flow diagram of a method for a manufacturing of the multiple poppet valve 10. In at least one first method step 80 the valve stem 18 with the poppets 14, 24, 34 is inserted into the first valve opening 46 of the first valve component 16. During this, the second poppet 24 is arranged in a region which later forms the interspace 44 between the first valve component 16 and the second valve component 26. In at least one further method step 82, the first valve component 16 and the valve stem 18 are inserted into the housing 58. In at least one further method step 20 the first valve component 16 comprising the first valve seat 12 is joined with the second valve component 26 comprising the second valve seat 22. The joining is preferably performed by pressing the second valve component 26 into a receiving region of the first valve component 16. After the joining, the first valve component 16 and the second valve component 26 are fixedly attached to each other. During the joining of the first valve component 16 and the second valve component 26, an initial distance 30' (see FIG. 3) between the first valve seat 12 and the second valve seat 22 is established. This initial distance 30' is intentionally made larger than a distance 40 between the first poppet 14 and the second poppet 24 along the valve stem 18. The first valve component 16 basically has a shape similar to a pot with a bottom hole (the first valve opening 46) and two stepped widenings at the locations where the second valve component 26 and the third valve component 36 are mounted to the first valve component 16. The second valve component 26 basically has a shape similar to a holed (the second valve opening 50) disc with an upwardly bent rim. The third valve component 36 basically has a shape similar to a holed (the third valve opening 52) disc.

In at least one further method step 84 a valve seat setting tool 48 (see FIG. 3) is slid over the valve stem 18. The valve seat setting tool 48 is intended to surround at least a section of the valve stem 18 during a following valve seat setting procedure. In at least one further method step 86 the valve seat setting tool 48 is brought into contact with an entire circumference of the second valve opening 50 of the second valve seat 22. Thereby, a uniform pressing force can be exerted to the whole second valve seat 22 in the following valve seat setting procedure.

In at least one further method step 28, a final distance 30 (see FIG. 3) between the first valve seat 12 and the second valve seat 22 is set by permanently displacing one of the valve seats 12, 22, namely the second valve seat 22, towards the other one of the valve seats 12, 22, namely the first valve seat 12. The permanent displacement of the second valve seat 22 is achieved by plastic deformation of the second valve component 26. The other valve seat 12 remains undeformed and undisplaced. During the displacement of the second valve seat 22 the first valve seat 12 is sealed by the first poppet 14. During the displacement of the second valve seat 22, the first valve seat 12 is kept sealed by forcing the first poppet 14 into a sealing position via the spring force of the spring 38.

In at least one method substep 88 of the method step 28 an externally generated pressure force of the supply pressure fluid 42 is applied to the interspace 44 between the first valve seat 12 and the second valve seat 22 during the displacement of the second valve seat 22. In at least one further method substep 90 of the method step 28 a leakage of the displaced second valve seat 22 is measured during the displacement procedure and the amount of displacement of the valve seat 22 is set depending on the measured leakage. Therefore, in a further method substep 92 or the method step 28 the displacement procedure is continued until a lower threshold leakage value is measured. As soon as the threshold is reached, the displacement procedure is stopped. In at least one further method substep 94 of the method step 28 the valve seat setting tool 48 is removed from the valve components 16, 26, 36.

In at least one further method step 96, after a completion of the setting process of the second valve seat 22, the third valve component 36 comprising the third valve seat 32 is joined with the first valve component 16, forming the further interspace 64 and the exhaust valve 54.

REFERENCE NUMBERS

10 Poppet valve
12 First valve seat
14 First poppet
16 First valve component
18 Valve stem
20 Method step
22 Second valve seat
24 Second poppet
26 Second valve component
28 Method step
30 Distance
32 Third valve seat
34 Third poppet
36 Third valve component
38 Spring
40 Distance
42 Supply pressure fluid
44 Interspace
46 First valve opening
48 Valve seat setting tool
50 Second valve opening
52 Third valve opening
54 Exhaust valve
56 Longitudinal direction
58 Housing
60 Free end
62 Hollow
64 Further interspace
66 Opening
68 Chamber
70 Control pressure outlet
72 Further chamber
74 Exhaust pressure outlet
76 Supply pressure opening
78 Supply pressure channel
80 Method step
82 Method step
84 Method step
86 Method step
88 Method substep
90 Method substep
92 Method substep
94 Method substep
96 Method step

The invention claimed is:

1. A method for a manufacturing of a multiple poppet valve, the multiple poppet valve at least comprising:

a first valve seat, a second valve seat, a first poppet for opening and closing the first valve seat, a second poppet for opening and closing the second valve seat, and a common valve stem comprising the first poppet and the second poppet, the method at least comprising the method steps of joining a first valve component comprising the first valve seat with a second valve component comprising the second valve seat, and subsequently setting a distance between the first valve seat and the second valve seat by permanently displacing one of the valve seats towards the other one of the valve seats, wherein during the displacement of the valve seat the other valve seat is sealed by the corresponding poppet.

2. The method according to claim 1, wherein the permanent displacement of the valve seat is achieved by plastic deformation of at least one of the valve components comprising the valve seat that is to be displaced.

3. The method according to claim 1, wherein during the joining of the valve components, an initial distance between the valve seats is intentionally made larger than a distance between the first poppet and the second poppet.

4. The method according to claim 1, wherein during the displacement of the valve seat, the other valve seat remains undeformed and undisplaced.

5. The method according to claim 1, wherein during the displacement of the valve seat, the other valve seat is kept sealed by forcing the corresponding poppet into a sealing position via a spring force of a spring which interacts with the valve stem and/or with the corresponding poppet.

6. The method according to claim 1, wherein during the displacement of the valve seat, an externally generated pressure force of a supply pressure fluid is applied to an interspace between the first valve seat and the second valve seat.

7. The method according to claim 1, wherein a leakage of at least the displaced valve seat is measured during the displacement of the valve seat and the amount of displacement of the valve seat is set depending on the measured leakage.

8. The method according to claim 1, wherein prior to the joining of the valve components, the valve stem comprising the first poppet and the second poppet is inserted into a designated interspace between the valve seats.

9. The method according to claim 8, wherein the valve seat, which is displaced during the setting of the distance between the first valve seat and the second valve seat, is arranged in front of the other valve seat when viewed along a longitudinal direction of the valve stem that is pointing towards a free end of the valve stem.

10. The method according to claim 1, wherein to set the distance between the first valve seat and the second valve seat, a valve seat setting tool is brought into contact with an entire circumference of a valve opening of the second valve seat in order to exert a uniform pressing force to the whole second valve seat.

11. The method according to claim 10, wherein the valve seat setting tool is slid over the valve stem, surrounding at least a section of the valve stem during the setting procedure.

12. The method according to claim 1, wherein after a completion of the setting process of the respective valve seat, a third valve component comprising a third valve seat is joined with the second valve component and/or with the first valve component.

13. The method according to claim 12, wherein the third valve seat is disposed in front of the first valve seat and in front of the second valve seat, when viewed along a longitudinal direction of the valve stem that is pointing towards a free end of the valve stem.

14. The method according to claim 12, wherein a direction in which the valve stem is to be moved in order to open the third valve seat is the opposite of a direction in which the valve stem is to be moved to open the first valve seat and the second valve seat.

15. A method for a manufacturing of a multiple poppet valve, the multiple poppet valve at least comprising:

a first valve seat, a second valve seat, a first poppet for opening and closing the first valve seat, a second poppet for opening and closing the second valve seat, and a common valve stem comprising the first poppet and the second poppet, the method at least comprising the method steps of joining a first valve component comprising the first valve seat with a second valve component comprising the second valve seat, and subsequently setting a distance between the first valve seat and the second valve seat by permanently displacing one of the valve seats towards the other one of the valve seats, wherein prior to the joining of the valve components, the valve stem comprising the first poppet and the second poppet is inserted into a designated interspace between the valve seats.

16. A method for a manufacturing of a multiple poppet valve, the multiple poppet valve at least comprising:

a first valve seat, a second valve seat, a first poppet for opening and closing the first valve seat, a second poppet for opening and closing the second valve seat, and a common valve stem comprising the first poppet and the second poppet, the method at least comprising the method steps of joining a first valve component comprising the first valve seat with a second valve component comprising the second valve seat, and subsequently setting a distance between the first valve seat and the second valve seat by permanently displacing one of the valve seats towards the other one of the valve seats, wherein after a completion of the setting process of the respective valve seat, a third valve component comprising a third valve seat is joined with the second valve component and/or with the first valve component, and wherein a direction in which the valve stem is to be moved in order to open the third valve seat is the opposite of a direction in which the valve stem is to be moved to open the first valve seat and the second valve seat.

* * * * *